United States Patent
Kwag et al.

(10) Patent No.: US 9,159,974 B2
(45) Date of Patent: Oct. 13, 2015

(54) BATTERY PACK AND ELECTRIC BIKE HAVING THE SAME

(75) Inventors: No-Hyun Kwag, Yongin-si (KR); Yong-Geol Kwon, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 488 days.

(21) Appl. No.: 13/544,793

(22) Filed: Jul. 9, 2012

(65) Prior Publication Data
US 2013/0118825 A1 May 16, 2013

(30) Foreign Application Priority Data

Nov. 14, 2011 (KR) ........................ 10-2011-0118262

(51) Int. Cl.
| H01M 2/10 | (2006.01) |
| B62M 6/90 | (2010.01) |
| B62K 19/40 | (2006.01) |
| H01M 10/42 | (2006.01) |

(52) U.S. Cl.
CPC ............. *H01M 2/1077* (2013.01); *B62K 19/40* (2013.01); *B62M 6/90* (2013.01); *H01M 2/1083* (2013.01); *H01M 10/425* (2013.01)

(58) Field of Classification Search
CPC ......... H01M 2/02; H01M 14/00; H01M 2/00; H02J 7/007; B60R 16/04
USPC ........ 320/107, 112; 429/7, 98, 123, 163, 178; 180/206.4, 220
See application file for complete search history.

(56) References Cited

U.S. PATENT DOCUMENTS

| 6,428,925 | B1 * | 8/2002 | Takeno et al. ................. 429/163 |
| 6,591,929 | B1 * | 7/2003 | Tsuboi et al. .............. 180/206.4 |
| 6,669,220 | B2 | 12/2003 | Meggiolan |
| 2004/0214079 | A1 * | 10/2004 | Simburger et al. ........... 429/123 |
| 2008/0088108 | A1 * | 4/2008 | Yoshida et al. ................ 280/200 |
| 2010/0159289 | A1 * | 6/2010 | Kim et al. .......................... 429/7 |
| 2010/0190052 | A1 * | 7/2010 | Rajani et al. .................. 429/178 |
| 2011/0117390 | A1 * | 5/2011 | Chun ................................ 429/7 |
| 2012/0322321 | A1 * | 12/2012 | Kwag et al. ................... 439/754 |
| 2013/0004818 | A1 * | 1/2013 | Honda et al. ..................... 429/98 |
| 2013/0118825 | A1 * | 5/2013 | Kwag et al. .................... 180/220 |
| 2013/0234649 | A1 * | 9/2013 | Sevier et al. .................. 320/107 |

FOREIGN PATENT DOCUMENTS

| JP | 2009-037904 A | 2/2009 |
| KR | 10-0590018 B1 | 6/2006 |

* cited by examiner

*Primary Examiner* — Richard Isla Rodas
*Assistant Examiner* — Dung V Bui
(74) *Attorney, Agent, or Firm* — Knobbe, Martens, Olson & Bear LLP

(57) ABSTRACT

Provided is an food packing material, manufacturing method. A battery pack and a electrical bike having the same are further provided. In particular, the battery pack may include a battery pack, battery array, a protecting circuit module, and a connection terminal section. The battery case may be formed as cylindrical or polygon. The battery array may include a plurality of batteries formed as multi-stage within the battery pack. The protecting circuit module may be provided between an upper portion of the battery array and an upper surface of the battery pack. A connection terminal portion may be formed at the lower stage of the battery pack and may include a power terminal and a control terminal. By providing the battery pack as bottle shape, the electrical bike can selectively accommodate the bottle for the bike and the battery pack.

7 Claims, 11 Drawing Sheets

BATTERY PACK AND ELECTRIC BIKE HAVING THE SAME

CROSS-REFERENCE TO RELATED APPLICATIONS

This application claims the benefit of priority of Korean Patent Application No. 10-2011-0118262, entitled "BATTERY PACK AND ELECTRIC BIKE HAVING THE SAME", and filed on Nov. 14, 2011, the entirety of which is hereby incorporated by reference.

BACKGROUND OF THE INVENTION

1. Field of the Invention

Embodiments of the present disclosure relate to a battery pack and a electric bike having the same and, more particularly, to a battery pack having bottle shape and the electric bike having the same.

2. Description of the Related Art

Recently, interest in alternative energy has increased and, thus, a method for applying a secondary battery to an electric driving device, such as a electric bike or an electric car and the like, has been developed. The bike may include a frame equipped rotateably with two wheels and a tire attached to the wheels. In addition, a paddle for driving the wheels may be installed to one side of the flame and therefore a driving force generated by driving the paddle is transferred to the wheels through a chain.

For this reason, when a person moves a long distance or climbs a hill while riding a bike, he/she consumes much energy. For this, electrical bikes have been developed as alternatives to bikes in which she/he pedals to spin a wheel using a manpower. The electrical bike replaces this manpower by driving a motor using a secondary battery which may be charged between use and discharged during use.

SUMMARY OF THE INVENTION

An object of embodiments of the present disclosure is to provide a battery pack formed in shape of a bottle for a bike.

In addition, an object of embodiments of the present disclosure is to provide an electrical bike capable of selectively accommodating the bottle and the battery pack for the bike.

Further, an object of embodiments of the present disclosure is to provide a battery pack and an electrical bike having a structure protecting an electrical connecting section from outside moisture.

An object of embodiments of the present disclosure is provide to a battery and an electrical hike for maintaining a stable structure in despite of external impact caused while operating an electrical operation.

In a battery pack providing power to an electrical bike, the battery pack in accordance to an embodiment of the present disclosure may include a battery array, a protecting circuit module and a connection terminal.

In the battery array, a plurality of batteries are placed within the battery pack having at least two more than stages and the batteries may be disposed so that a least one stage of the plurality of stages forms a space.

The protecting circuit module may be provided between the upper portion of the battery array and the upper surface of the battery pack.

The connection terminal section may be provided in a lower stage of the battery pack and includes a power terminal and a control terminal.

In addition, the power terminal may be connected to the protecting circuit module by the power line to input/output a charging/discharging current. In this case, the control terminal may be connected to the protecting circuit module by a control line to input a control signal from the outside.

Moreover, the protecting circuit module may include a incision portion at an outer side thereof and the battery pack has an third fixed protrusion portion corresponding to the protrusion portion in inner side to restrict the movement of the protecting circuit module when the protecting circuit module is inserted.

In addition, the battery array may be formed in an upper and lower two stages, any one stage of the battery array of the upper and lower two stages includes twelve batteries and the remaining one stage may includes nine batteries.

Moreover, the battery array may be connected in seven serials and three parallel manners.

Further, the battery array may include an output end thereof connected to the protecting circuit module.

In addition, a spacer may be provided that forms an inserting position of each battery including the battery array.

Moreover, the control terminal and the power terminal may be formed in inserting manners. In addition, the control terminal and the power terminal may be formed in a female connector shape.

In addition, the protecting circuit module may be formed as a substrates having at least two or more multi-stage.

On the other hand, the electrical bike in accordance with embodiments of the present disclosure may include a battery pack, a bottle cage, and a bike frame.

The battery pack formed as a cylindrical shape or a polygon shape, a battery array that a plurality of battery are provided in multi stages within the batterypack, a protecting circuit module provided between the upper portion of the battery array and the upper surface of the batterypack, and a connection terminal section provided in the lower stage of the battery pack and including a power terminal and a control terminal A bottle cage may form a first support portion for supporting the battery pack and an external terminal providing a connector electrically connecting the each terminal of the connection terminal sections to the upper stage of the first support portion.

The bike frame may include the bottle cage fixed to at least one of a down tubes or a seat tubes.

In addition, the bottle cage may include a fixed wing for restricting lateral movement of the battery pack.

In addition, a first groove portion may be formed at the upper stage of the battery case. In this case, a fixed member formed in a shape similar to that of the first groove portion may be further included. The fixed member may be fixed to the bike frame and may be inserted into the first groove portion from the upper portion of the battery pack to form a first fixed protrusion fixing the battery pack.

Moreover, the fixed member may include a second support portion fixed to the frame, an extension extending from the second support portion to the upper side of the battery pack to enter a first fixed protrusion and an adjustment mechanism for regulating the amount of the fixed protrusion that extends within the first groove portion.

In addition, the adjustment mechanism may regulate an access to the fixed protrusion in the screw manners.

In addition, the adjustment mechanism may include a lock to be rotated through a separate key.

In addition, the external terminal portion may be formed to be upwardly protruded. In this case, a step may be formed to insert the external terminal portion The second fixed protrusion may be formed on the upper surface of the first support portion. In this case, a second groove portion corresponding to the second fixed protrusion may be formed at the lower stage of the batterypack.

In addition, the connection terminal of the lower stage of the battery pack may be formed to be protruded. In this case, the first support portion forms a step to accommodate the connection terminal portion. Further, a third fixed protrusion may be positioned at the upper stage of the battery pack. In this case a third groove portion corresponding to third fixed protrusion may be formed in the first support portion.

Furthermore, a step into which the first support portion may be inserted at the lower end of the battery pack to predetermined depth may be formed.

In addition, the battery pack may be formed to have shape and size of the bottle for the bike and the bottle cage may selectively accommodates any one of either the battery pack or the bottle for the bike.

Moreover, the protecting cover may be formed as shape of the lower stage and interposed between the support portion of the bottle cage and the bottle for the bike may be further provided. In addition, each terminal portion of the connection terminal portion and each connector of the external terminal may be connected in a inserting manners. Furthermore, each terminal of the connection terminal portion may be formed in female connector shape and each connector of the external terminal portion may be formed in male shape.

According to an embodiment of the present disclosure, by providing the battery pack in a bottle shape, the electrical bike may accommodate the bottle for the bike and a battery pack.

In addition, according to an embodiment of the present disclosure, although the electric bike operates at the state accommodating the battery pack or the bottle for the bike, there an effect may be provided that protects the electrical connection terminal from external moisture and moisture of the bottle for the bike.

In addition, an embodiment of the present disclosure provides a stable structure in spite of an external impact at the time of operation of the bike.

BRIEF DESCRIPTION OF THE DRAWINGS

The accompanying drawings, together with the specification, illustrate exemplary embodiments of the present disclosure, and, together with the description, serve to explain the principles of the disclosed embodiments.

DETAILED DESCRIPTION OF THE PREFERRED EMBODIMENT

Figure 1:
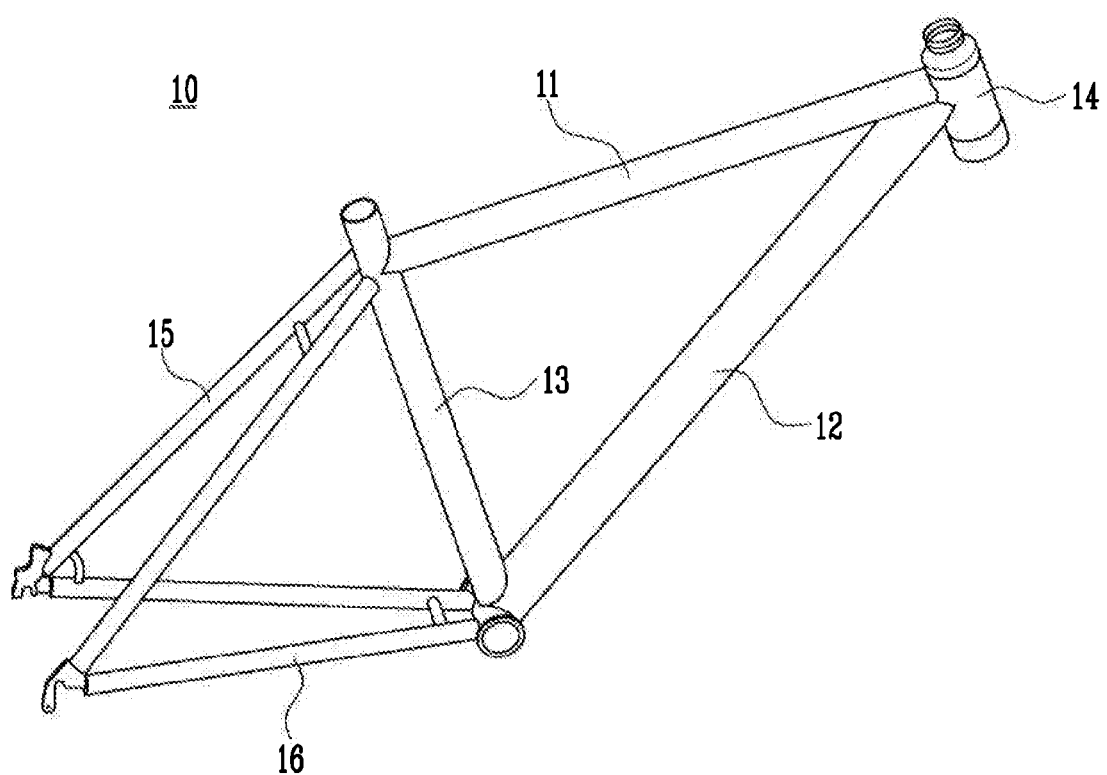
FIG. 1 is a perspective view showing a frame structure of a conventional bike.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Generally, a bike or electrical bike 10 includes the bike frame, which is a basis framework, having a steering system such as a handle and the like, a driving system such as a crank and a sprocket, other wheel set and the like, as shown in the embodiment of FIG. 1.

The electrical bike may replace or assist a manpower driving the driving system of the bike.

Meanwhile, the bike frame 10 may include a top tube 11, a down tube 12, seat tube 13, seat stay 15, a chain stay 16 and a head tube 14.

Generally, a fastening portion may be formed at the down tube 12 and the seat tube 13 and, thus, may equip the bottle cage capable of accommodating the bottle cage.

The present disclosure may relate, in certain embodiments, to a bike frame capable of selectively accommodating a battery pack capable of being positioned in a manner similar to that of a bottle.

The battery pack 100 will be described below with reference to FIG. 2 and FIG. 3.

Figure 2:
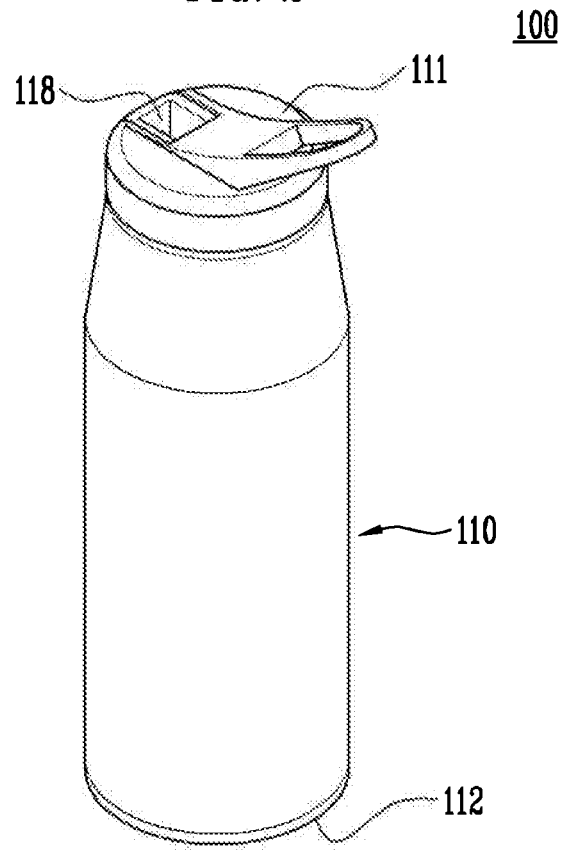
FIG. 2 is a bottom perspective view showing a battery pack according to an embodiment of the present disclosure.
Figure 3:
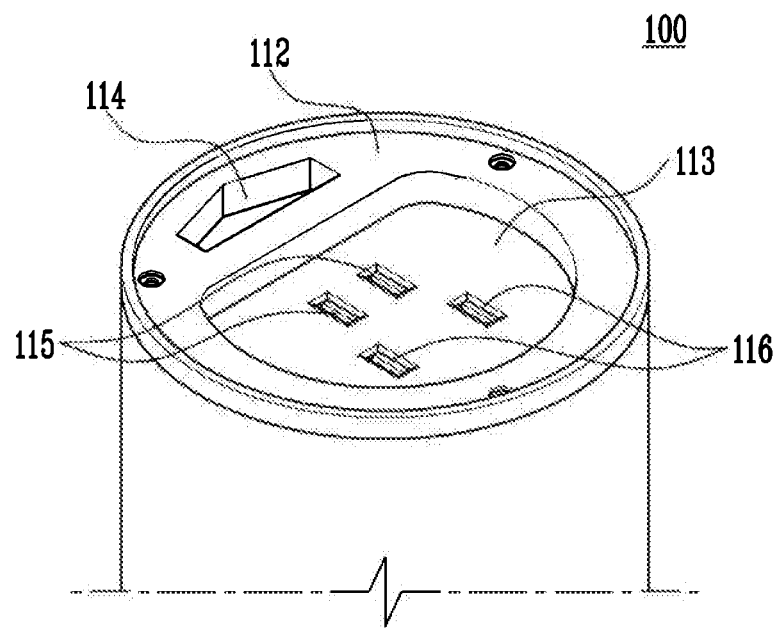
FIG. 3 is a partial perspective view showing a battery pack

FIG. 2 and FIG. 3 are perspective views showing a battery pack 100 according to an embodiment of the present disclosure and FIG. 3 is a bottom perspective view partially showing an embodiment of the battery pack 100.

The battery pack 100, in accordance with an embodiment of the present disclosure, may be formed as shape of bottle for the bike.

The battery pack 100 may be formed in cylindrical and/or polygon shapes as shown in FIG. 2. It may be understood that these shapes are provided for illustration and that embodiments of the battery pack 100 may be formed in other shapes that may be accommodated within a bike frame in a manner similar to a bottle (e.g., a water bottle).

In addition, the battery pack 100 may include a lid portion 111 formed as shape similar to the bottle for the bike at a upper portion thereof.

A first groove portion 118 may be formed at an upper portion of the lid 111. A fixed protrusion 303 of a fixed member 300, as described below with respect to FIG. 10, may be inserted to help fixing the battery pack 100.

As shown in FIG. 3, a connection terminal portion 113 and a second terminal portion 114 may be formed on a lower surface 112 of the battery pack 100. The connection terminal portion 113 may form a constant step to be formed as an internally depressed shape, as compared with the lower surface 112 of the battery pack 100. The connection terminal portion 113 may also be provided with connection terminals, such as a power terminal 115 and a control terminal 116, for electrically connecting with the outside. The power terminal 115 and the control terminal 116 may be formed as a pair of the terminal. The power terminal 115 may serve as a connecting port for transmitting power from the battery pack 100 to the bike driving system of the outside and the control terminal 116 may serve as the connecting port for transmitting a state of the battery to an indicating portion (not shown) of the outside or receiving a electrical control signal concerning control of the battery pack 100 from control section (not shown).

In other embodiments, the power terminal 115 and the control terminal 116 may be formed in an inserting manner and may be formed in a female connector shape or a male connector shape. The second groove portion 114 may be different from the connection terminal portion 113 and may be formed in internally depressed shape. In addition, the lower surface 112 of the battery pack 100 has a step having a constant height at a perimeter of an edge thereof to be internally formed.

Figure 4:
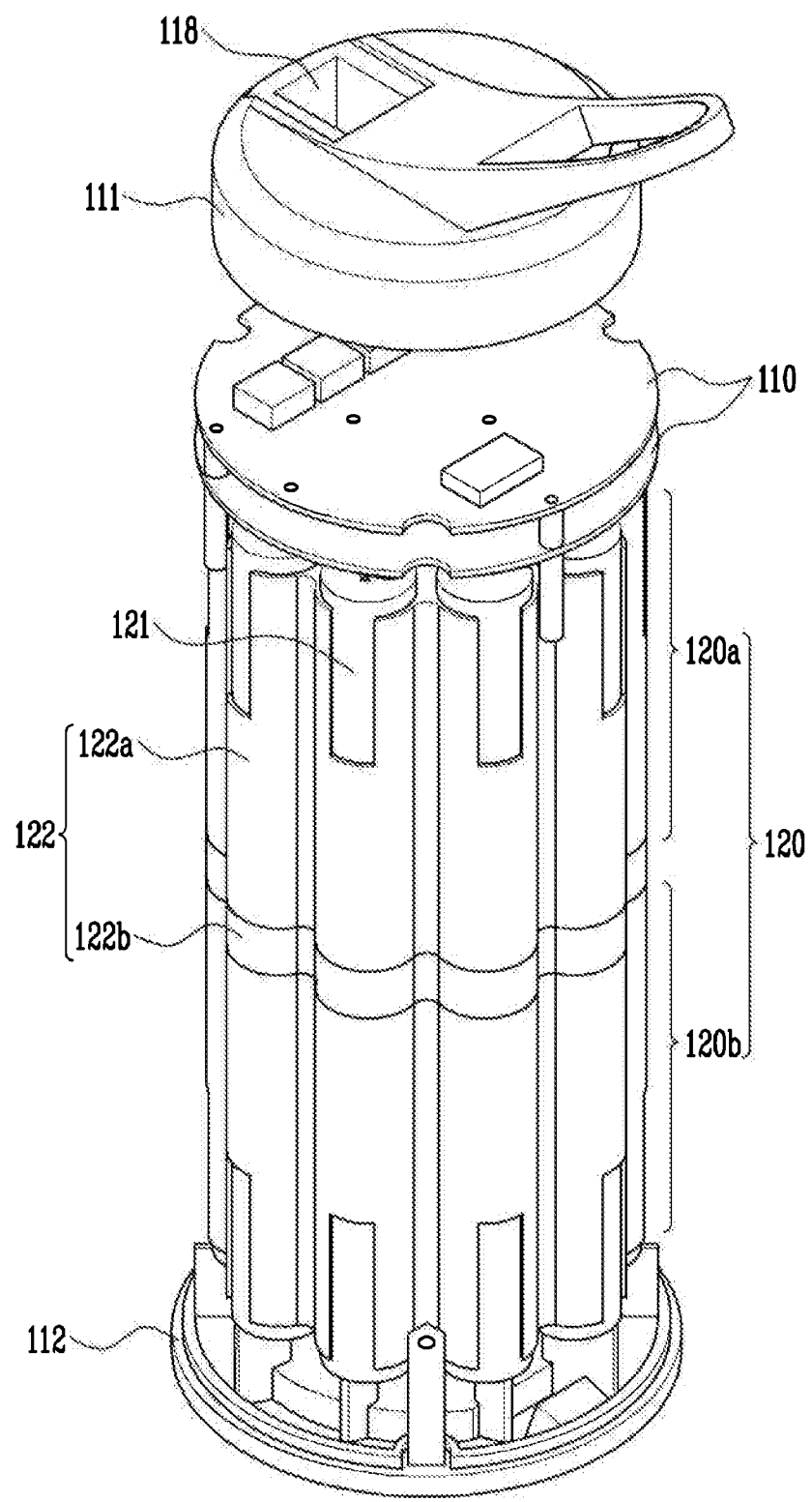
FIG. 4 is a disassemble perspective view showing a internal structure battery pack.
Figure 5:
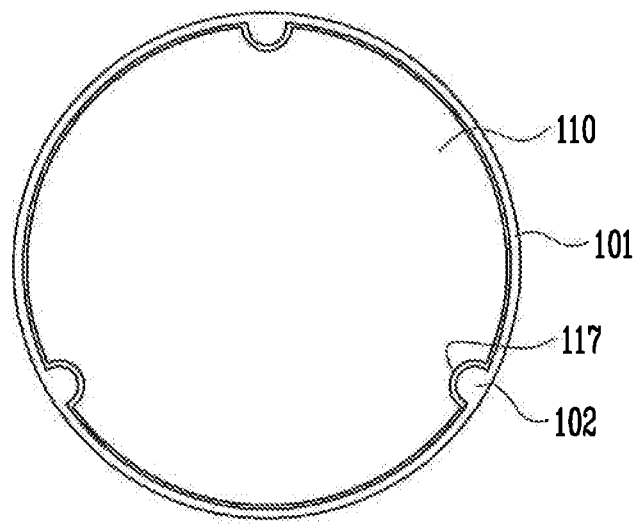
FIG. 5 is a cross-sectional view showing the appearance of battery pack.
Figure 6:
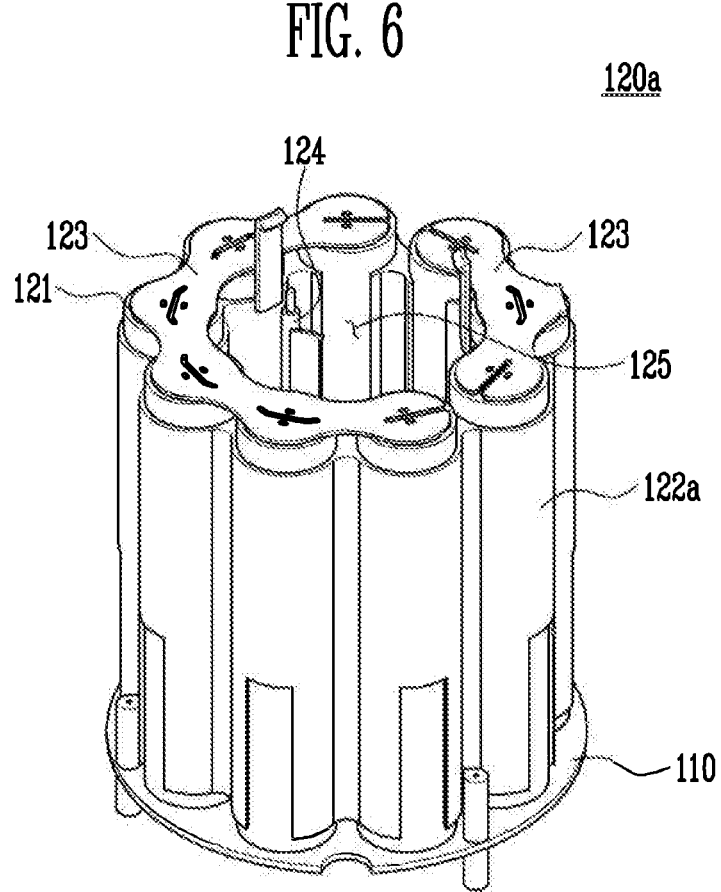
FIG. 6 is a bottom perspective view showing a upper battery array of a battery pack.
Figure 7:
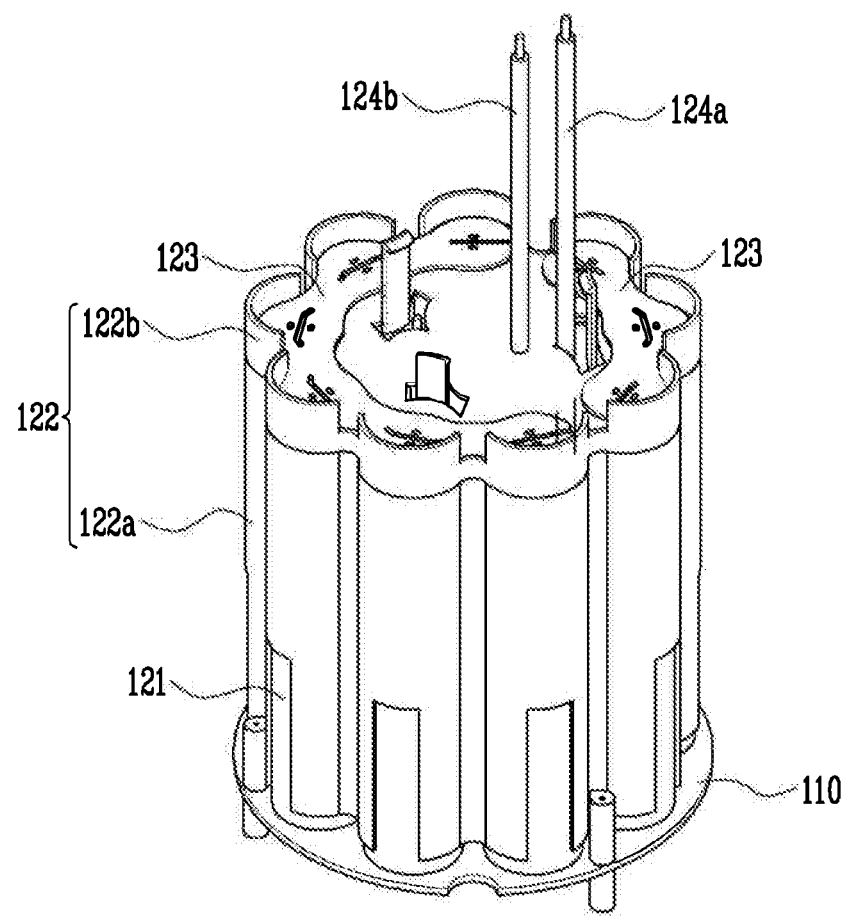
FIG. 7 is a bottom-perspective view showing an appearance which a battery pack is provided with a spacer.
Figure 8:
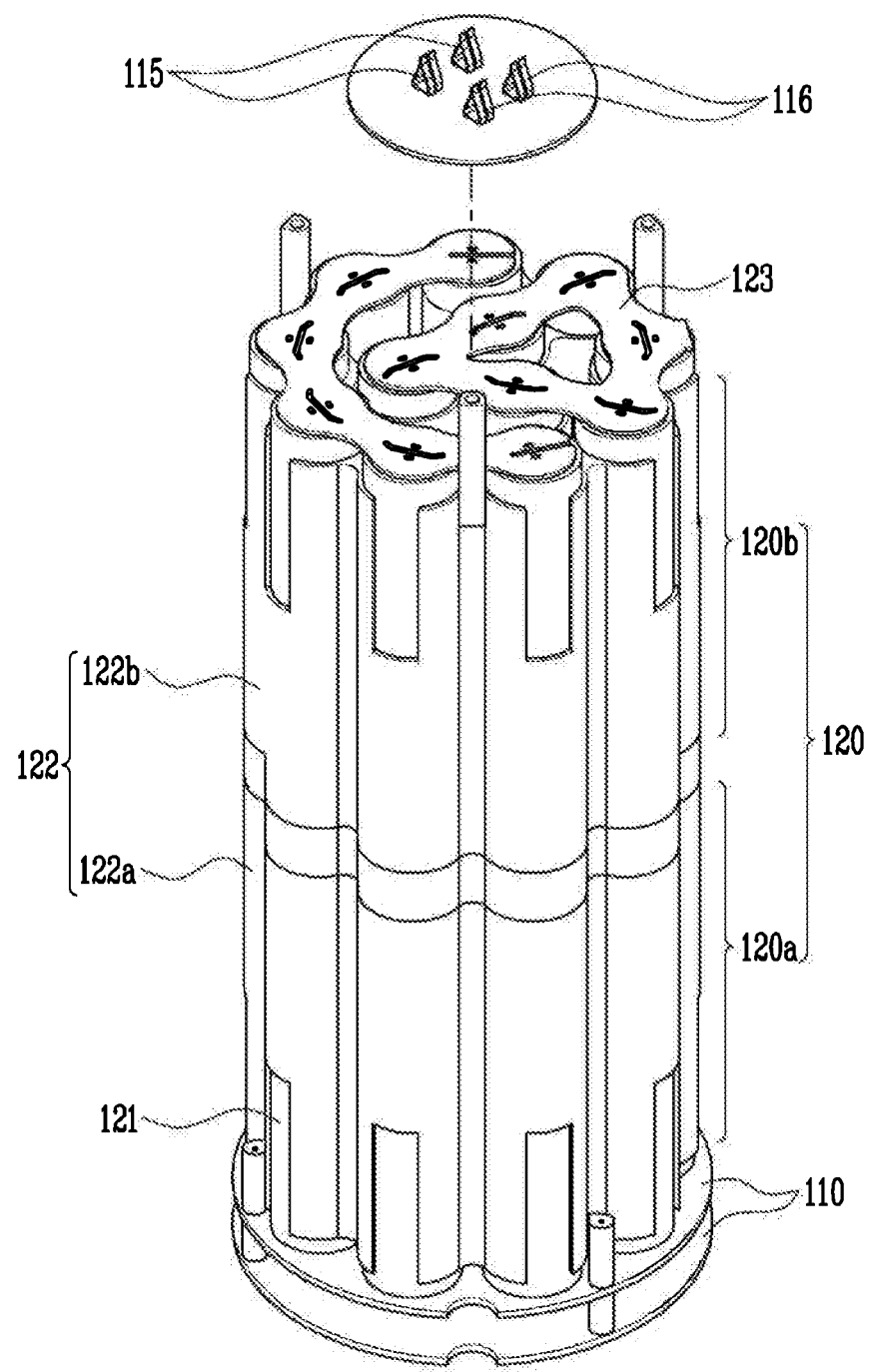
FIG. 8 is a bottom perspective view showing an internal structure of a battery pack.

Embodiments of an internal configuration for the battery pack 100 will be described below with reference to FIGS. 4 8. FIG. 4 is a disassembled, perspective view showing the internal construction of the battery pack 100 and FIG. 5 is a cross-sectional view showing the battery pack 100. FIG. 6 is a bottom perspective view of an upper battery array of the battery pack 100, FIG. 7 is a bottom perspective view showing the battery pack 100 having a second spacer, and FIG. 8 is a bottom perspective view showing the internal configuration of the battery pack 100.

A battery array 120 and the protecting circuit module 110 may be accommodated within the battery pack 100.

The protecting circuit module 110 may be provided between an upper portion of the battery array 120 and an upper portion of the battery pack 100. The protecting circuit module 110 may include various elements and circuits in order to provide for a safety of each battery cell 121 of the battery array 120 at the time of charge and discharge of the battery pack 100 and may take charge of control of charge and discharge. If the protecting circuit module 110 is accommodated within a water bottle shape for the bike, the space necessary to accommodate various elements would be shortage. For this reason, the protecting circuit module 110 may be formed as a substrate including more than two stages.

In addition, an incision portion 117 (see, e.g., FIG. 5) may be formed at an outer edge of the protecting circuit module 110. In certain embodiments, a wiring electrically connecting each element and the like may be provided between a plurality of the substrates, the substrate of the upper and the lower protecting circuit module 110 may be separated and freely rotated should be prevented. At an inner peripheral surface of the battery pack 100, a third fixed protrusion 102 corresponding to the above-mentioned incision portion 117 may be formed. When the protecting circuit module 110 may be accommodated within the battery pack 100, the third fixed protrusion 102 may be inserted into the incision portion 117 of the protecting circuit module 110, thereby restricting the free rotation of the protecting circuit module 110.

At the battery array 120, the plurality of battery cells 121 may be provided in a multi-stage. The each stage of the battery array 120 may be arranged in circle shape corresponding to a battery pack 100 of the outside.

If the type assisting a manpower driving the driving system of the electrical bike using a power of the battery pack 100 may be used, a motor having a output characteristics of approximately 26V and 130 W would be utilized. In this case, preferably, the battery array 120 may be connected in seven series to obtain a sufficient capacity and may be connected in three parallel. That is, the total of twenty-one batteries may be connected in seven serials and three parallel manners.

In the embodiment, the battery array 120 may be arranged at two stages of the upper stage battery array 120a and the lower stage-battery array 120b as shown in FIG. 4. In this case, the total of nine batteries may be arranged in the upper stage 120a and the total of nine batteries or more (e.g., twelve batteries) may be arranged in the lower stage 120b. The number of the battery cells of the upper stage 120a and the lower stage 120b may be variously changed, if necessary.

Each the battery cells 121 may be correctly inserted into a position to be positioned and preferably provides each first spacer 122a at the upper stage and the upper stage thereof to be escaped randomly after the insertion. The first spacer 122a formed in the upper stage and the lower stage may be assembled to be correctly positioned using back the second spacer 122b An inner peripheral surface of the second spacer 122b may be formed similarly to shape of the outer peripheral surface of the first spacer 122a and may be fixed in a small gap if the first spacer 122a may be inserted. That is, the second spacer 122b would be not randomly escaped if the first spacer 122a may be inserted.

Now, an electrical connection within the battery pack relationship will be explained. The battery array 120 may include an output stage connected to the protecting circuit module 110. The power transmitted to the protecting circuit module 110 may be electrically connected back to the power terminal 115 formed in the lower surface 112 of the battery pack 100. In addition, the power may be electrically connected to the control terminal 116 formed in the lower surface 112 of the battery pack 100 from the protecting circuit module 110 through a separate connection line 124. In this case, a minimum of two different types of the connection line 124 may be passed through the battery array 120. That is, a line 124a transmitting the power to the power terminal 115 from the protecting circuit module 110 to the control terminal 116 and a line 124b for transmitting/receiving various control signals and state signals from the protecting circuit module 110 to the control terminal 116 may be provided (see, e.g., FIG. 7). A line (not shown) for transmitting the power from the battery array 120 to the protecting circuit module 110 according to an arrangement method of the battery array 120 may be additionally provided.

Meanwhile, in the upper stage-battery array 120a, a plurality of batteries (e.g., nine batteries cells 121) may be disposed as circle shape as shown in FIG. 6. A constant spacing portion 125 may be formed within the upper stage-battery array 120a and the connection line 124 crossing the internal portion of the battery array 120 may be provided within the spacing portion 125. Such a spacing portion 125 may be formed in any one of a plurality of stages including battery array 120 and simultaneously formed at the plurality of stages.

Figure 9:
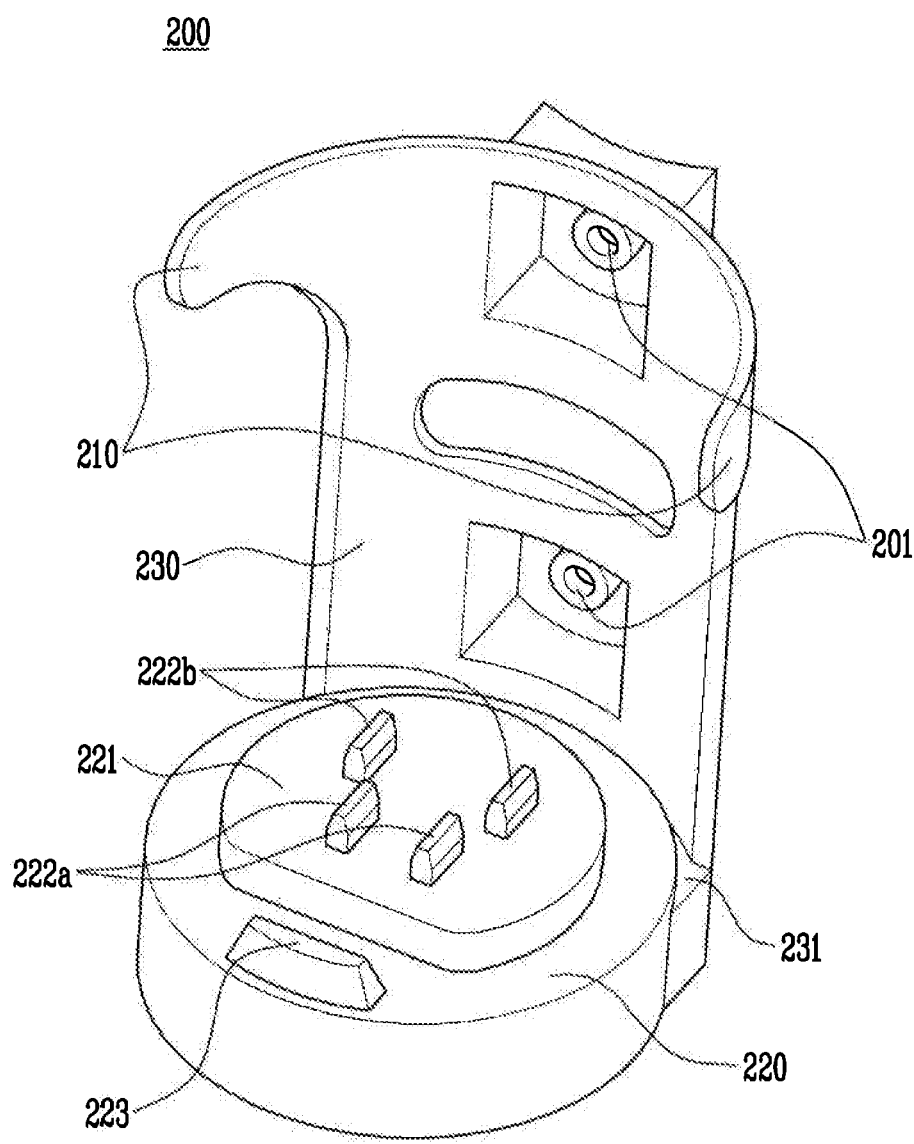
FIG. 9 is a perspective view showing an appearance of a bottle cage corresponding to a battery pack.

An embodiment of the bottle cage 200 will be described with reference to FIG. 9. FIG. 9 is a perspective view of the bottle cage corresponding to the battery pack in FIG. 3.

The bottle cage 200 may include a cage body 230 and a first support portion 220.

A fastener 201 may be disposed within the cage body 230 formed to tighten the down tube 12 or seat tube 13. The cage body 230 may be formed as a curved surface to correspond to the outer peripheral surface the battery pack 100 and the fixed wing 210 may be formed at both side surfaces of the cage body 230 to restrict a lateral movement of the battery pack 100.

A first support portion 220 for supporting the lower surface 112 of the battery pack 100 may be formed from the lower stage of the bottle cage 200. Between the bottle cage 200 and the first support portion 220, the lower connection portion 231 having lower constant depth than the upper surface of the first support portion 220 may be formed.

At the upper stage of first support portion 220, the external terminal 221 may be formed. The external terminal 221 forms a step which may be higher by constant height than the upper surface of the first support portion 220. The external terminal 221 has the upper surface thereof including the power connector 222a and the control connector 222b connected to the above-mentioned power terminal 115 (see FIG. 3) and the control terminal 116 (see FIG. 3). When the power terminal 115 and the control terminal 116 are formed in female connector shape, respectively, the power connector 222a and the control connector 222b may be formed in male connector shape.

In addition, a second fixed protrusion 223 may be formed within the upper surface of the first support portion 220. The second fixed protrusion 223 may be inserted into the second groove portion 114 of the lower surface 112 of the battery pack 100 to restrict the movement of the battery pack 100.

Figure 10:
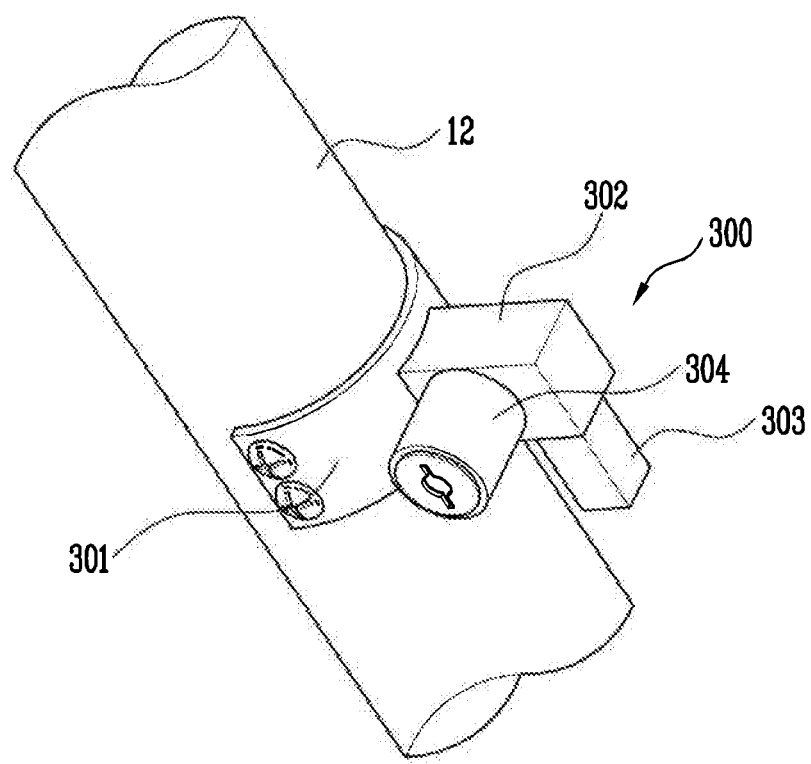
FIG. 10 is a perspective showing a fixed number.
Figure 11:
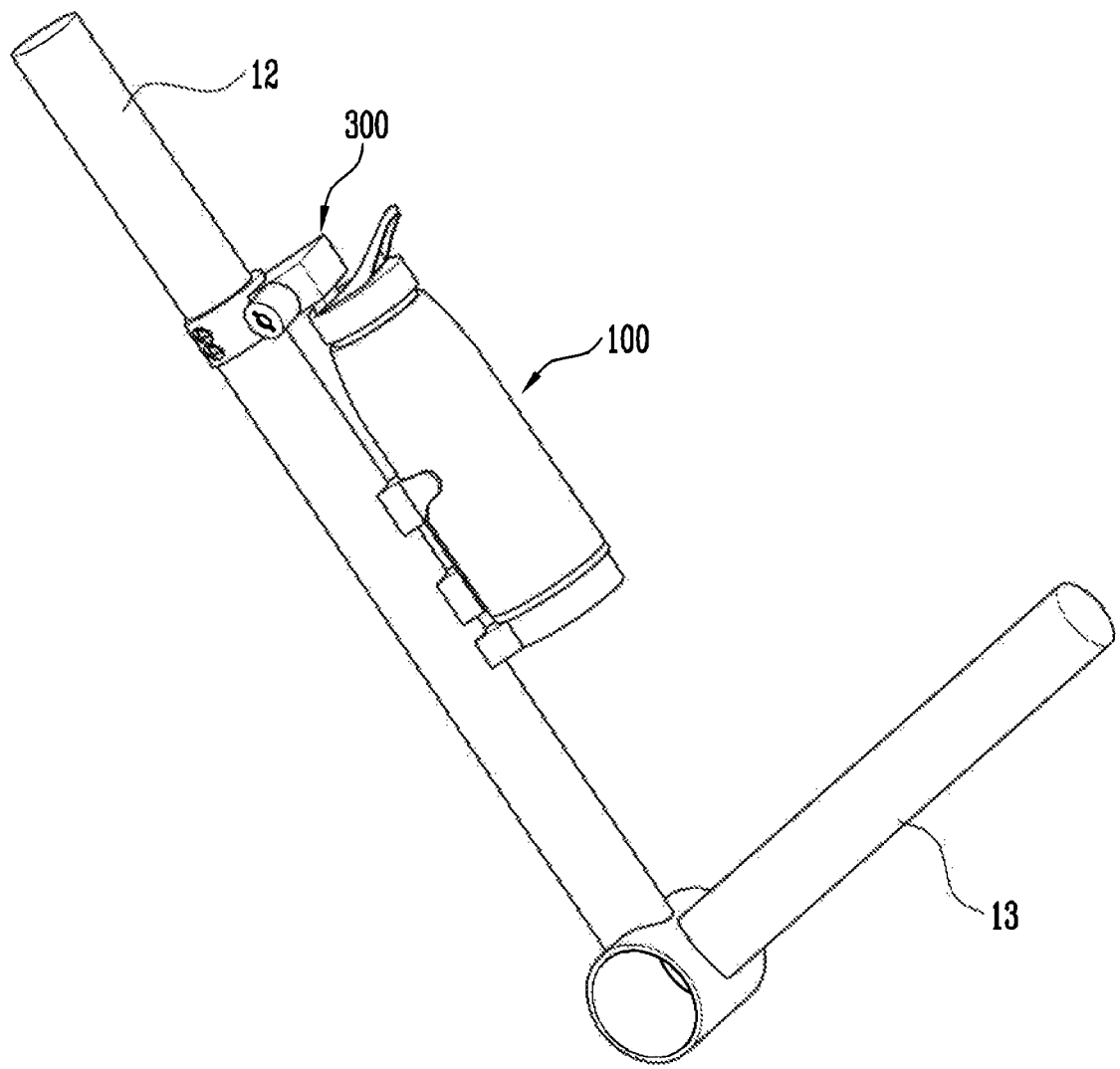
FIG. 11 is a partial perspective a appearance with which a battery pack is equipped.

An embodiment of the fixed member 300 will be described with reference to FIG. 10 and FIG. 11. FIG. 10 is a perspective view showing the fixed member 300 and FIG. 11 is a partial perspective view showing an appearance with which the battery pack 100 may be attached.

The fixed member 300 may include a second support portion 301, an extension portion 302, an adjustment mechanism 304, and a first fixed protrusion 301. The second support portion 301 may be fixed to the down tube 12 of the electrical bike and the like to help supporting the entire fixed member 300. The extension portion 302 may extend from the second support portion 301. The lower stage of the extension 302 may be provided with a first fixed protrusion 303 that enters an inner side of an outer side of the extension 302. The fixed protrusion 303 may protrude into the outer side or enter the inner side of the extension depending on a rotation of the adjustment mechanism 304. The adjustment mechanism 304 may be formed in a screw type and the like and preferably, may be formed in lock manners to require a certain qualification at the time of detachment of the battery pack 100. That is, the first fixed protrusion 303 may protrude from the extension 302 or hide the extension portion 302 by rotating the adjustment mechanism 304 using a key corresponding to the adjustment mechanism 304.

Figure 12:
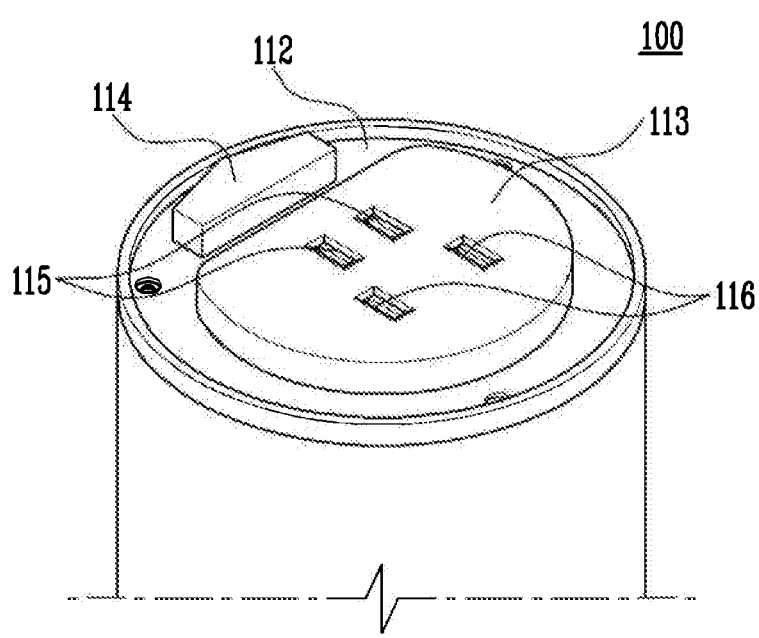
FIG. 12 is a partially showing bottom view showing an appearance of a battery pack according to another embodiment.
Figure 13:
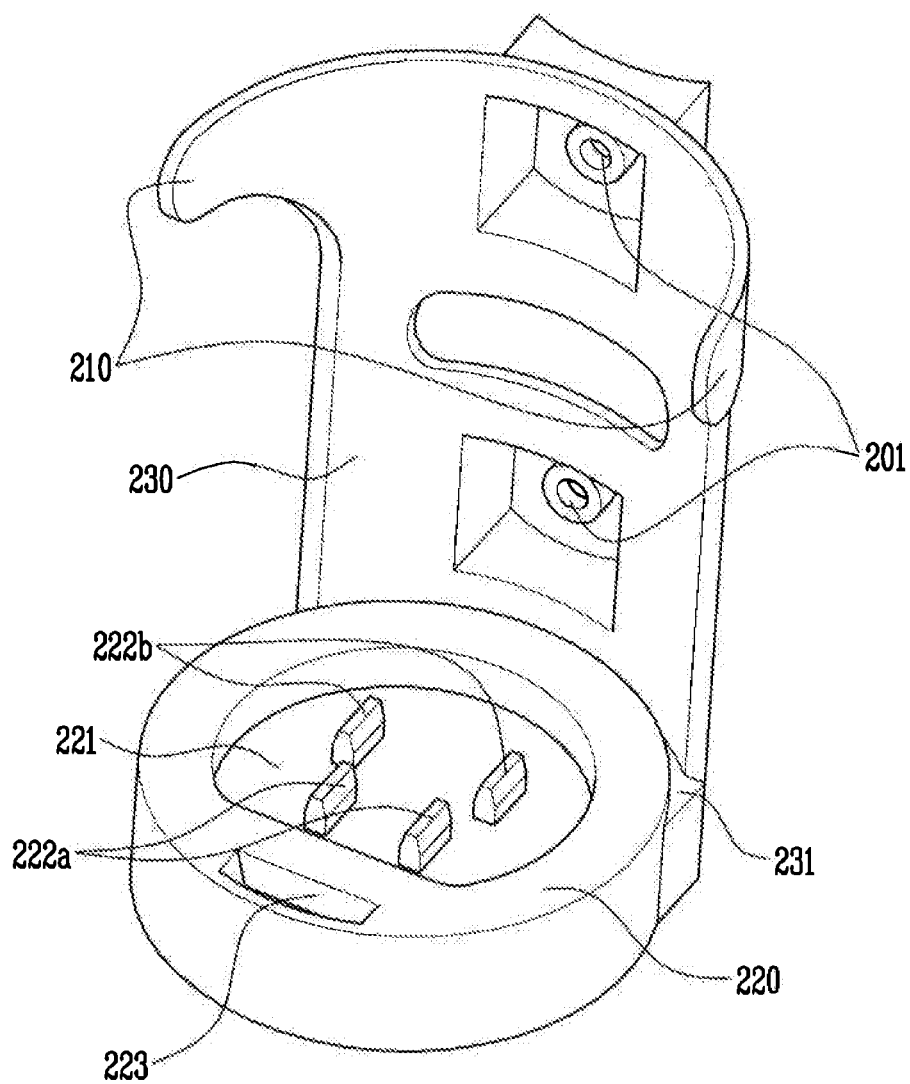
FIG. 13 is a perspective view showing an appearance of a bottle cage corresponding to a battery pack.

An embodiment of a mounting structure of a battery pack 100a and a bottle cage 200a according to another embodiment will be described with reference to FIG. 12 and FIG. 13. FIG. 12 is a partial bottom view showing an appearance of the battery pack 100a according to another embodiment and FIG. 13 is a perspective view showing an appearance of an embodiment of the bottle cage 200a corresponding to the battery pack 100a shown in FIG. 12.

The battery pack 100a according to an embodiment of the disclosure may be different from the battery pack 100 in FIG. 3 in that a connecting terminal portion 113a of the lower surface 112a may externally protrude. In addition, the third fixed protrusion 114a may be formed to protrude from outside thereof instead of the second groove portion 114.

Meanwhile, the first support portion 220a may form a step in which an external terminal portion 221a is depressed, as compared to the first support portion 220, to correspond to the battery pack 100a shown in the embodiment of FIG. 12. In addition, a third groove portion 223a corresponding to the fixed protrusion 114a may be formed.

In this case, the connection terminal portion 113a of the battery pack 100a may be inserted into the external terminal portion 221a and may be seated therein and the third fixed protrusion 114a may be inserted into the third groove portion 223a and may be seated therein.

The bottle cage 200a in accordance with an embodiment of the present disclosure may not include the protrusion having direct contact with the bottom of the bottle for the bike, so that it is more beneficial to accommodate the bottle for the bike.

The bottle cage 200 of the embodiment of FIG. 2 may provide the first support portion 220 with a protecting cover (not shown) formed in shape of the lower stage portion of the battery pack 100 (see FIG. 3), thereby accommodating the bottle for the bike. In this case, at least a portion of the protecting cover may be formed from a waterproof material.

The terms "approximately", "about", and "substantially" as used herein represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A battery pack, comprising:
   a battery array providing a plurality of batteries to an inner portion of the battery pack as at least 2 stages or more and positioned the battery as an annular shape, wherein the at least two forms a space at inner portion thereof wherein the space extends from an upper surface of the at least 2 stages of batteries to a lower surface of the at least 2 stages of batteries
   a protecting circuit module provided between the upper portion of the battery array and the upper surface of the battery pack;
   a connection terminal portion disposed on the lower stage of the battery pack; and
   a control terminal positioned adjacent the lower surface of the at least 2 stages of batteries and a power terminal connected to the protecting circuit module through the space of the battery array arranged in an annular shape.

2. The battery pack of claim 1, wherein an incision portion is formed at an outer side of the protecting circuit module and a third fixed protrusion corresponding to the incision portion is formed in an inner side of the battery pack, wherein the third fixed protrusion is configured to restrict the movement of the protecting circuit module when inserted in the incision portion.

3. The battery pack of claim 1, wherein the battery array is formed as a upper and lower stages, wherein any one of the upper and lower two stages of the battery array includes nine batteries arranged at the outer side thereof in an annular shape and a remaining one stage includes nine batteries arranged as annular shape at outer side thereof 4. The battery pack of claim 3, wherein the battery array includes a connection tab connecting in seven series and three parallel manners between the upper stage and the lower stage of the upper and lower two stages of the battery array.

5. The battery pack of claim 1, further comprising a spacer forming an inserting position of each battery having the battery array.

6. The battery pack of claim 1, wherein, the control terminal and the power terminal are formed in a female connector shape.

7. The battery pack of claim 1, wherein the protecting circuit module is formed as at least two or more multi-stage substrates.

* * * * *